United States Patent [19]
Fisherman

[11] Patent Number: 5,757,560
[45] Date of Patent: May 26, 1998

[54] INDEX PRINT VIEWER

[76] Inventor: Carl Fisherman, 725 McCoy Rd., Franklin Lakes, N.J. 07417

[21] Appl. No.: 852,989

[22] Filed: May 8, 1997

[51] Int. Cl.$^6$ ............................. G02B 07/02; G02B 27/02
[52] U.S. Cl. ..................................... 359/821; 359/802
[58] Field of Search ............................. 359/819, 821, 359/802, 806, 822

[56] References Cited

U.S. PATENT DOCUMENTS

| | | | |
|---|---|---|---|
| 4,293,190 | 10/1981 | Clover | 359/802 |
| 5,166,714 | 11/1992 | Fiorda | 396/29 |
| 5,172,279 | 12/1992 | Leib et al. | 359/894 |
| 5,497,272 | 3/1996 | Wun | 359/821 |
| 5,576,897 | 11/1996 | Kuo | 359/822 |
| 5,581,333 | 12/1996 | Takemura et al. | 355/243 |

*Primary Examiner*—Frank G. Font
*Assistant Examiner*—Ricky Mack
*Attorney, Agent, or Firm*—McAulay Fisher Nissen Goldberg & Kiel, LLP

[57] ABSTRACT

An index print viewer is described which has a base, a recessed bed for receiving a single index print prior thereon, and having a movable carriage assembly that is slidable over the bed. The carriage assembly includes a carrier for movement in a first direction, and a bridge moveable over the carriage in a second direction, the bridge including a magnifying lens for viewing individual images from the index print in an enlarged fashion. A cropping mask is optionally provided which allows the person using the index print viewer to selectably locate openings corresponding to three separate print formats over each image, so that the person can determine, through the magnification and cropping effect, which of the available print formats should be selected.

12 Claims, 5 Drawing Sheets

INDEX PRINT VIEWER

TECHNICAL FIELD

This invention relates to an index print viewer for index prints obtained from APS type and other type cameras and more particularly to an index print viewer having a magnifying lens and a selective mask for showing how prints made using various standard cropping formats would appear prior to printing.

BACKGROUND

Recently, a new photographic standard has been introduced which combines a new camera, film and development technique known as APS, which stands for "advanced photographic system". The APS system was the result of a collaborative effort by the major film and camera producers to make it simpler, cheaper and more environmentally acceptable to take photographs, develop film and make prints.

In a typical photo finishing operation, individual rolls of photographic film are removed from their containing cartridges, which are broken open and discarded. The film is removed from the cartridges and the resulting film strips are spliced together end to end to form a larger roll that is easier to handle with automated processing equipment. The spliced film roll is unwound and rewound several times as it runs through film development and paper printing stations. Near the end of the process, the spliced film rolls are cut into strips again, corresponding to the customer order and matched with the prints for return to the customer.

Information required for processing is retrieved in two different operations. The first is a manual sorting step in the beginning of the process that uses product information and customer instructions delivered to the photo finisher with the processing order. The film is manually sorted into packages according to the required parameters for film development and paper printing. The second is in the printer itself after the film is developed. The printer scans the developed images on the film to determine and set printing parameters such as transfer densities and color corrections.

In the APS system, photographic film strips are removed from the cartridges and spliced together end to end, as discussed previously. However, the empty cartridges are maintained during processing in storage in the same sequential order corresponding to the spliced film strips, so that the film can be returned to the cartridges at the end of the process. The cartridges are thus reused as film storage containers after the film is developed.

During processing, the film strips are first developed and then, after development, are electronically scanned to capture an electronic representation of the developed images. The film strips are later used for optically printing the developed images onto photographic paper. In the APS system, the film strips include recorded information in magnetic or optical form, representing conditions of camera exposure, and other settings, such as whether a flash was used, which are captured when the photograph is taken. These are read during the electronic scanning of the developed film, and combined with the electronically scanned image information to generate index prints, each print including a plurality of images printed in a small format on a single rectangular sheet. The number of images corresponds to the length of the original film strip. The index print, in essence, replacing the negatives, which are returned to the customer in the cartridge. This avoids handling which could damage the negatives.

One of the advantages of the APS system is that when a roll of film is developed into an index print, it provides a single card having a rough dimension of about 4"×6", containing typically a number of small images representing each photograph that was taken per roll of film. Each image measures about ¾"×½". From the index print, a person can choose to obtain reprints selected from three standard formats. One is akin to a standard image format, known as "classic", which is simply a traditional 4"×6" print, the second is a 4"×11.5" "Panoramic" format and the third is a "High Definition TV" (HDTV) format which enlarges the entire photograph without cropping to a 4"×7" print.

One problem with all index print images is that they are so small it is difficult to see image details. Another problem is to visualize which format best suits the particular photograph.

SUMMARY OF THE INVENTION

It is an object of the present invention to provide an apparatus which assists a person in viewing the small index print images.

It is a further object of the present invention to provide an apparatus which assists a person in visualizing the results of choosing one of the available formats for producing reprints from the index print images.

These and other objects of the present invention are achieved by an index print viewer comprising a base for receiving an index print thereon, a movable carriage slidably mounted on the base for traverse thereover in a first direction, the carriage having an opening corresponding to at least the width of an index print image, and a length corresponding to at least a width of the index print card, a movable bridge mounted to and slidable over the carriage for movement in a second direction, the bridge having a magnifying lens mounted therein for viewing an index print image over which the bridge is positioned, and, optionally, a cropping mask, mounted to the carriage, the cropping mask having proportionally sized openings corresponding to each format, the openings selectively locatable between the lens and the image so that the person can view each magnified image in the selection of cropped formats before ordering reprints.

Using the invention, it is relatively simple to insert an index print onto the base, and to move the carriage and bridge thereover for viewing each image in a magnified form, and further allowing viewing through the cropping mask to see how each image would appear according to the various formats available.

DETAIL DESCRIPTION OF THE INVENTION

Figure 1:
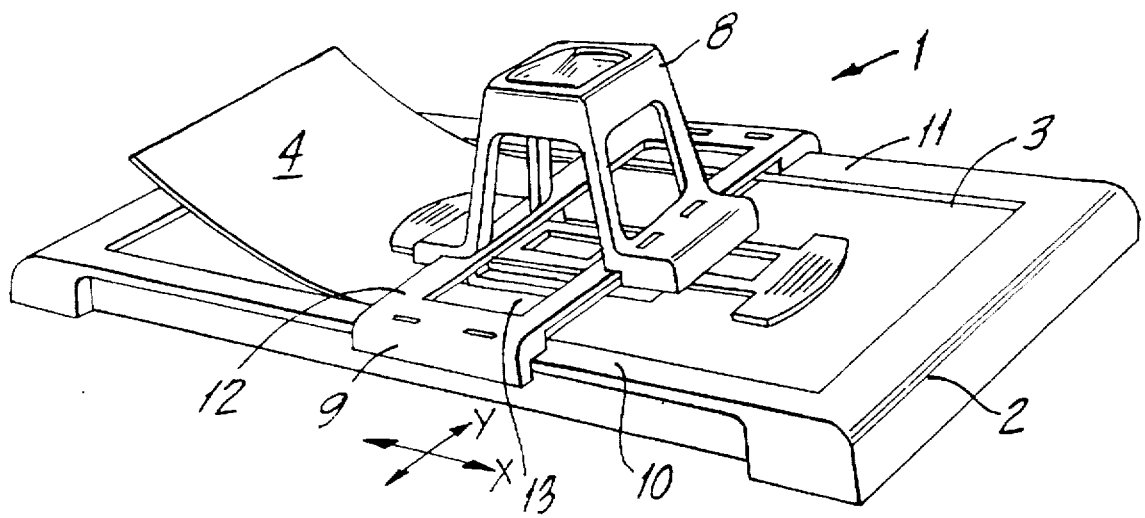
FIG. 1 is a perspective view showing the index print viewer according to the present invention.
Figure 2:
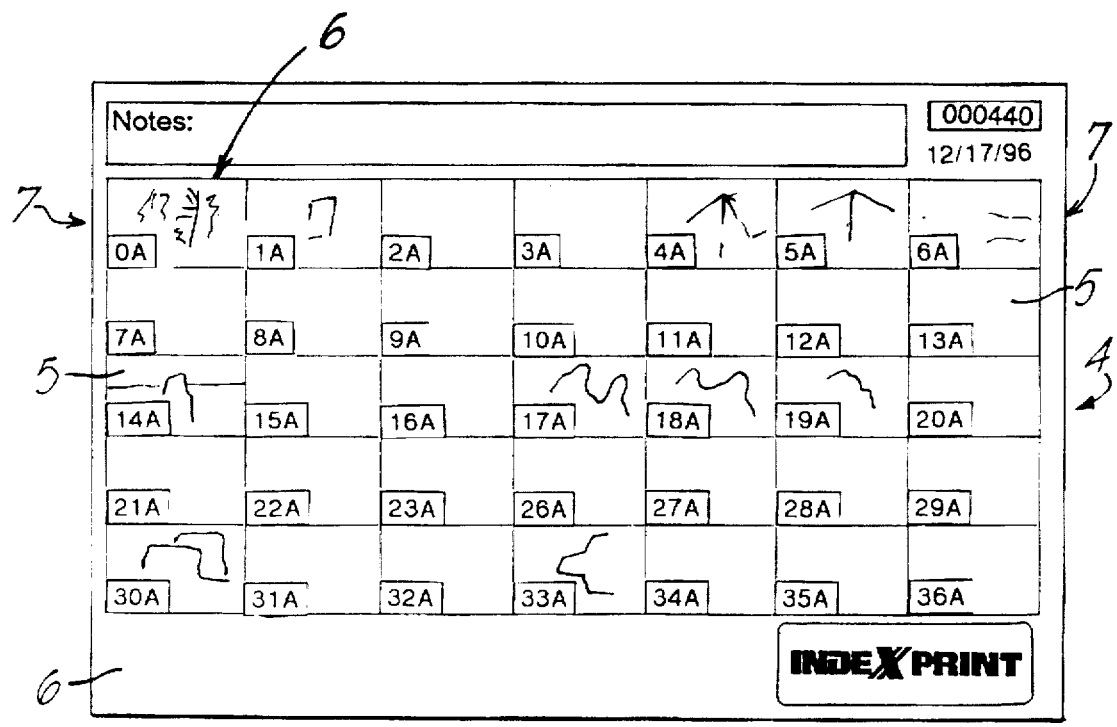
FIG. 2 is a view of a prior art index print.

Referring to FIG. 1, a perspective view of an index print viewer 1 is shown. The index print viewer has a base 2 with a recessed bed 3 sized to accept a single index print card 4 therein. The index print card, as shown in FIG. 2, includes a plurality of individual images 5 in small format. These are arranged in seven vertical rows 6 and five horizontal rows 7, as 35 images are included on the index print. Of course, the number of images may vary, depending on the length of film chosen, and this can vary from 15 to 40 images.

Figure 3:
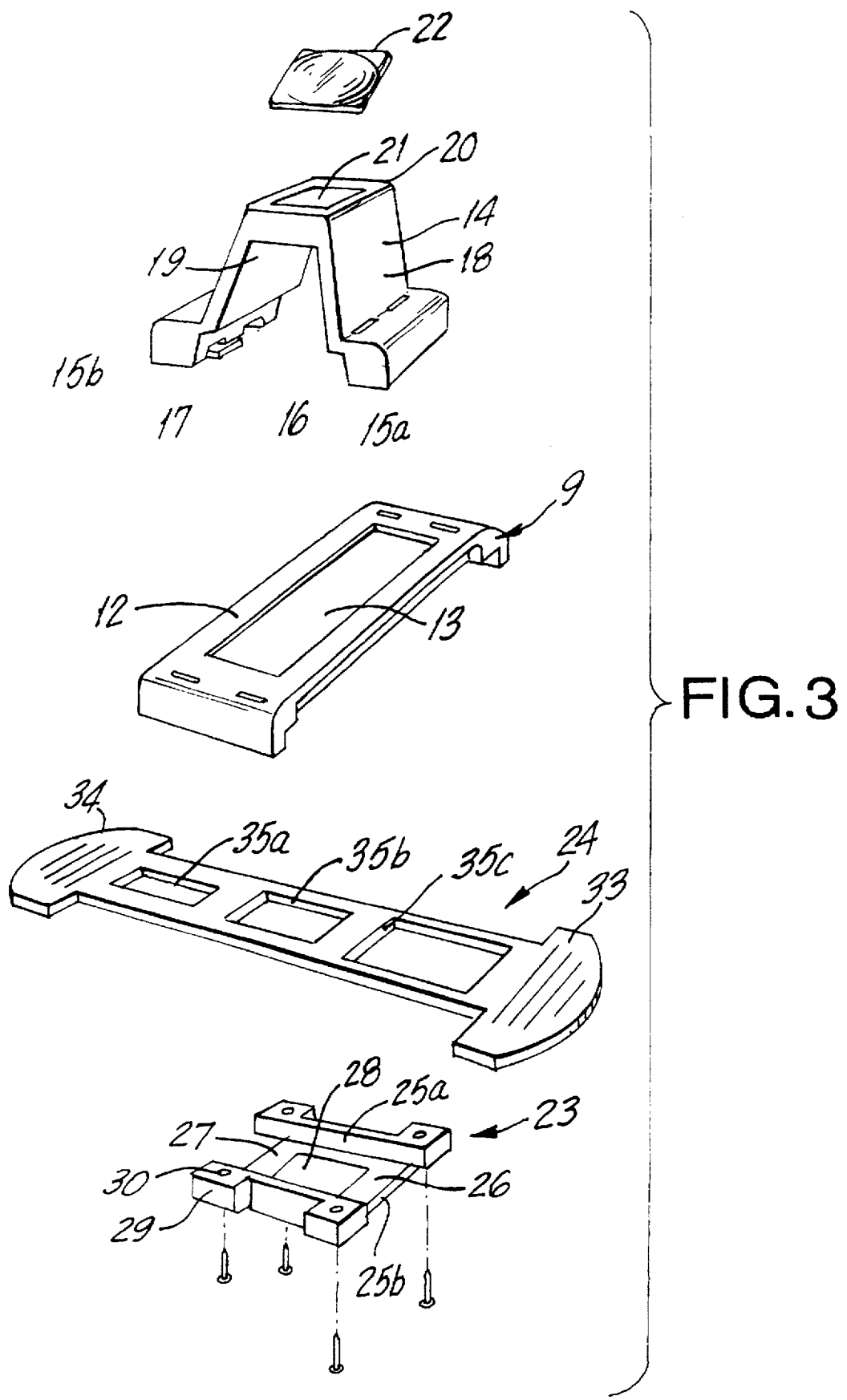
FIG. 3 is an exploded view showing the components of the movable carriage assembly.

The index print viewer 1 includes a movable carriage assembly 8 that is slidable over the bed. As shown in FIG. 3, the carriage assembly includes a carrier 9 which spans the width of the base, resting on a pair of side rails 10 and 11, best seen in FIG. 1. This allows sliding movement of the carrier in an X axis direction. The carrier has a flat elongated surface 12 having a viewing opening 13 therein, having a first dimension corresponding to at least the width or length of a single index image, and a second dimension corresponding to at least a vertical or horizontal row of index print images. In this embodiment, the first dimension corresponds to the width of a single index image and the second dimension corresponds to a length of a vertical row of images. Thus, the carrier can be positioned over a single vertical row, orientating the carriage assembly in the X axis direction.

A viewing bridge 14 is located over the carrier, the viewing bridge having a pair of side walls 15a and 15b and associated shoulders 16 and 17 which form a receptacle for receiving the carrier therein. The viewing bridge is slidingly received so that the shoulders can move over the surface 12 along a Y axis direction over the carrier. The bridge 14 includes a pair of substantially upright legs 18 and 19 leading to a platform 20 having an opening 21 within which a magnifying lens 22 is mounted. Generally, the length of the legs is related to the degree of magnification and the focal length of the lens, for providing a clear proportional magnified image of limited distortion. Thus, the length can vary with the selection of the lens. Typically, a lens providing a magnification factor of about 1.5× to 5× may be used, with a magnification of about 3× preferred. The platform opening 21 is of course aligned with the carrier opening 12 for magnified viewing of an image on the index print.

Figure 4A:
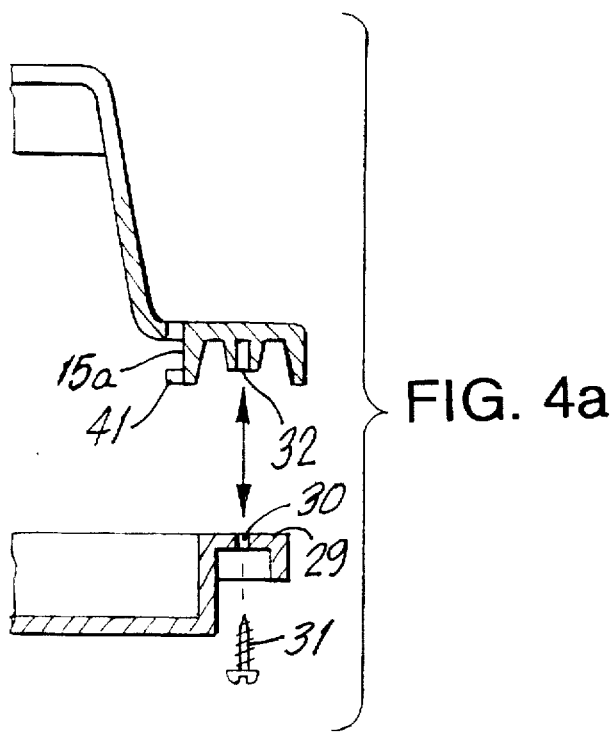
FIG. 4a is a cross-sectional view showing the connection between the lens bridge and the mounting tray.

To hold the bridge to the carrier and provide selected format viewing through the bridge, a mounting tray 23 and an optionally slidable cropping mask 24 are located beneath the carrier. The mounting tray includes a pair of sidewalls 25a and 25b and a bottom wall 26 forming a channel 27 within which the cropping mask is slidably disposed, the mask movable along the X axis direction. The tray further includes an opening 28 at least as large as a single index print image for viewing therethrough. Four lugs 29 having passages 30 are provided for receiving fasteners 31 therein. These fasteners engage corresponding recesses 32 in the bridge, as best seen in FIG. 4a. This, in essence, sandwiches the mask and carrier between the bridge and tray, with sufficient space so as to allow free movement of the bridge and tray over the carrier.

The cropping mask 24 is an elongated rectangular member having a pair of handles 33 and 34, on opposite ends thereof. Located between the handles are a plurality of openings 35 which correspond, proportionally, to the formats available for producing prints of the images. In this embodiment, the three formats are those available, for example, when using the APS camera and film system, that is, a full panoramic image, corresponding with the opening 35a, a high definition image, corresponding to the opening 35b, and a traditional or classic image, corresponding to the opening 35c.

Figure 4B:
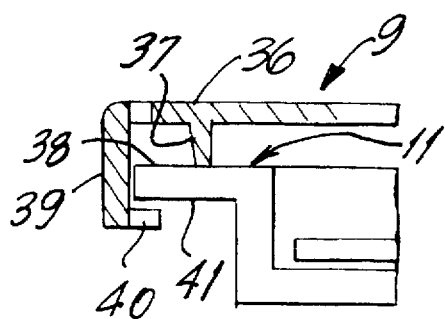
FIG. 4b is a cross-sectional view showing the connection between the carriage and the base.

Referring to FIG. 4b, a sliding connection between the carrier 9 and the side rail 11 of the bed is shown. The carrier has a top wall 36 from which a downwardly extending projection 37 extends into engagement with a top surface 38 of the side rail 11. The carrier further has an outer wall 39, which has an inwardly projecting tab 40, which is engagable with a lower surface 41 of the side rail, so as to keep the side rail and carrier in engagement as the carrier slides over the surface 38.

With respect to FIG. 4a, it is seen that the bridge side wall 15a, has a similar inwardly projecting tab 41, which assures that the bridge is held vertically to the carrier while allowing horizontal movement over the carrier.

Figure 5:
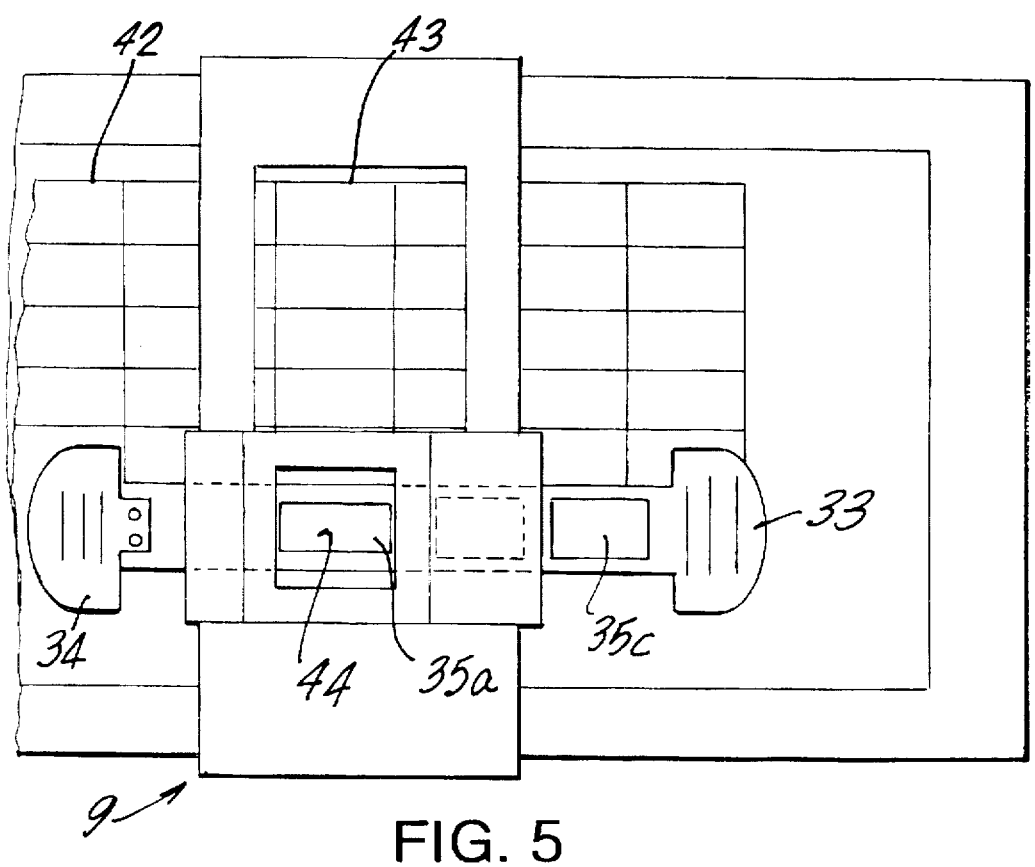
FIG. 5 is a top view showing how the bridge assembly is positioned over an index image for viewing an image through the panoramic crop opening.

Referring to FIG. 5, the operation of index print viewer is illustrated. An index print 42, is placed on the bed in the base and the carriage assembly 8 is slid over the bed in an X axis direction, into alignment with a particular vertical row 43. The bridge is then moved in the Y axis direction until a particular index print image 44 is selected for possible printing. During the selection process, it is best to view the images through the opening 35c, as this provides a complete magnified view of each image during the traverse of the area by the bridge over the index print. This assists in enhancing the ability to select images for further study. Once the image is selected, by moving the bridge over the carrier in the Y axis direction, the bridge and carrier remain stationary and the cropping mask is pulled, using the handles over the image so that the image can be viewed in each of the available formats. As shown in FIG. 5, the image is viewed in accordance with the full panoramic format, with the magnifier assisting in recognizing what details of the image are enhanced, or eliminated by borders, in accordance with the selected format.

Figure 6:
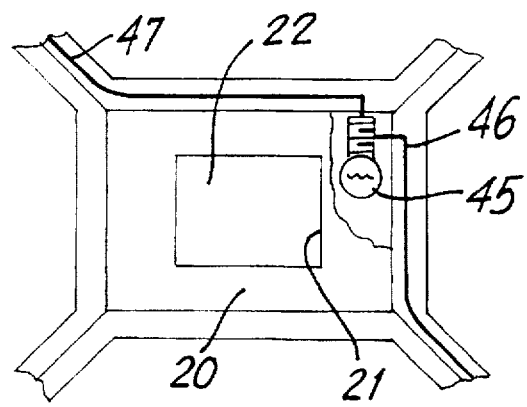
FIG. 6 is a perspective view of an alternative embodiment of the invention having a lighted viewer.
Figure 7:
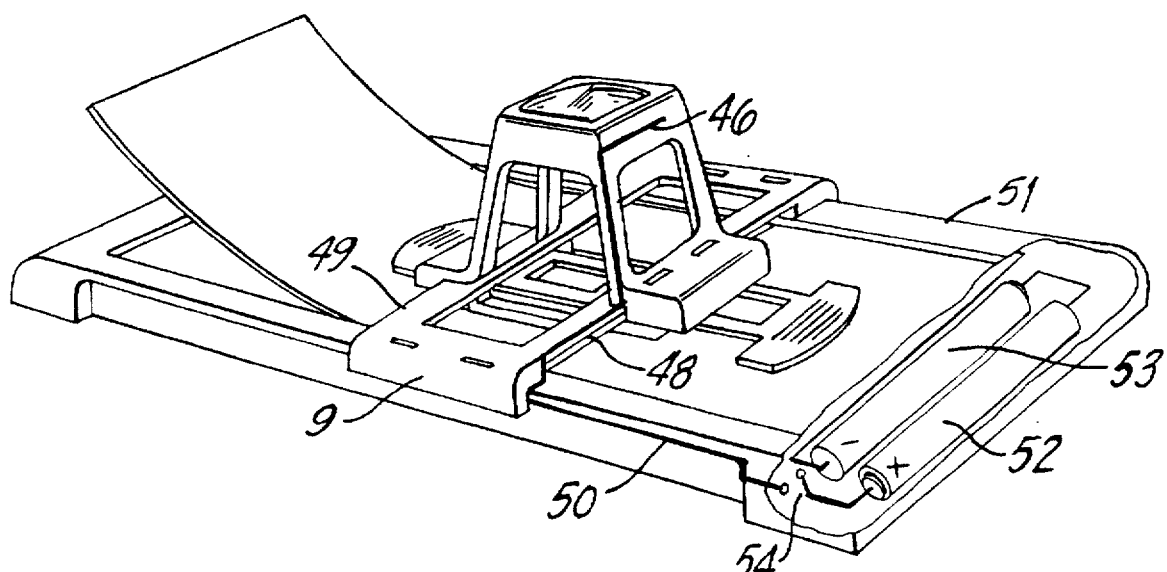
FIG. 7 is a partial top view of the bridge of FIG. 6.

Referring to FIGS. 6 and 7, an alternative embodiment of the invention is shown. In this embodiment, a light 45 is located adjacent to the lens 22 located in the opening 21 in the platform 20. This illuminates the image located beneath the lens. Power is supplied to this light through a pair of conductors 46 and 47 which lead to contact strips 48 and 49 on each side of the carrier 9. These are of opposite polarity on opposite sides of the carrier. Further contact strips 50 and 51 are provided on the slide rails, with these connected to batteries 52 and 53 located beneath one end of the base 2. To ease illustration these have been shown as dark lines extending from the battery compartment to the viewing bridge. To use the light, a switch 54 is located adjacent one of the slide rails. This may be a toggle or slide switch, though other switching devices may be used.

Utilizing the index print viewer, it is much easier to select images for reprinting and to select the best format, thereby complimenting the concept of simplified, efficient and flexible selection of images for reprinting, by eliminating printing of images in an undesired format, or those which simply, when viewed in a magnified fashion, are not worth reprinting.

Figure 8:
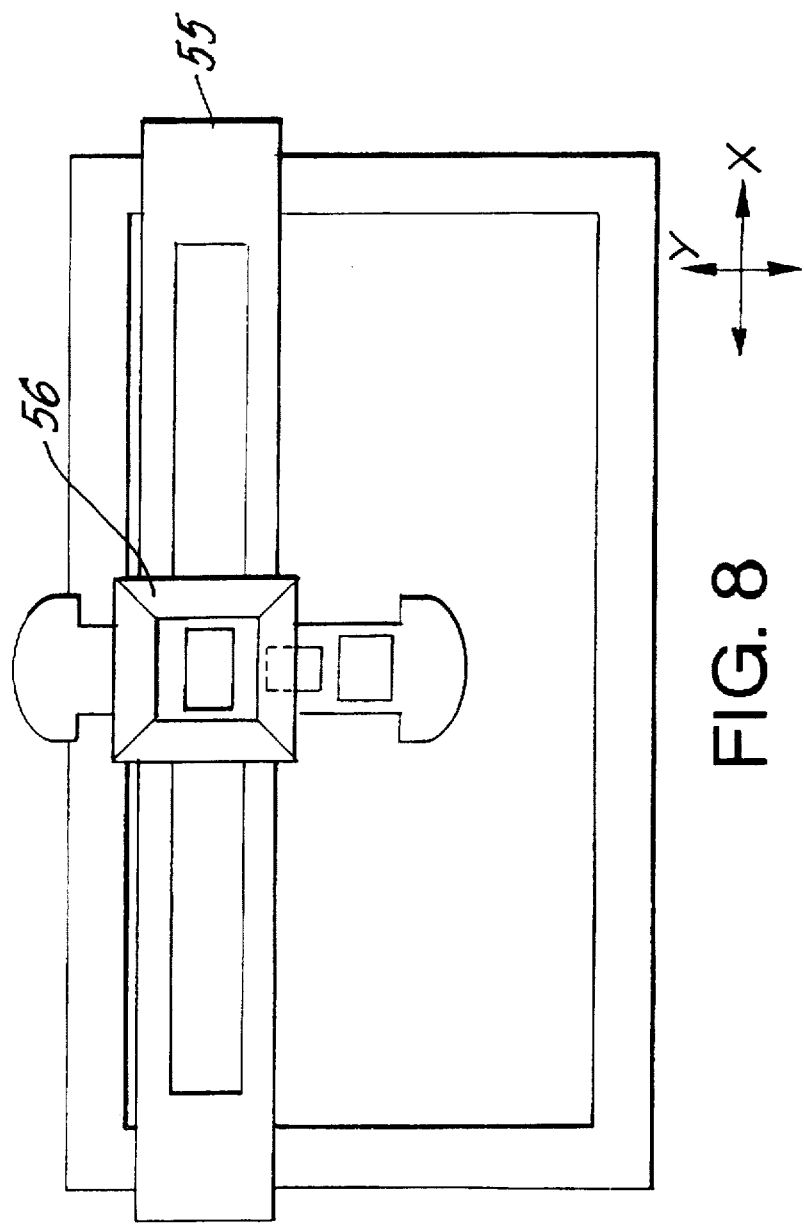
FIG. 8 is a perspective view showing an alternative embodiment of the invention.

While preferred embodiments of the present invention have been shown and described, it will be understood by those skilled in the art that various changes or modifications could be made without varying from the scope of the invention. For example, while the carrier is shown as moving over the bed in the X axis direction, with the bridge moved in the Y axis direction, these can be reversed as shown in FIG. 8 which has a carrier 55 extending in the Y axis direction and a bridge 56 movable in the X axis direction. The same advantages are of course obtained using this embodiment of the invention. Also, viewing through the cropping mask may not always be necessary and thus, the cropping mask may not always be provided, or may be removable using a detachable handle at one end, so as to provide the greatest flexibility to the user.

I claim:

1. A index print viewer comprising:

a base for receiving an index print thereon;

a movable carriage slidably mounted on the base for traverse thereover in a first direction, the carrier having an opening having a first dimension to at least an index print image, and a second dimension corresponding to at least a dimension of a row of index print images; and, a movable bridge mounted to and slidable over the carriage for movement in a second direction, the bridge having a magnifying lens mounted therein for viewing an index print image over which the bridge is positioned.

2. The index print viewer of claim 1 further comprising:

a cropping mask, mounted to the carriage, the cropping mask having a plurality of proportionally sized openings corresponding to a plurality of print formats, the cropping mask being movable beneath the magnifying lens for orienting the openings selectively between the lens and the image so that a person can view each magnified image in a selected print format.

3. The index print viewer of claim 2 wherein the cropping mask has three openings corresponding to three print formats.

4. The index print viewer of claim 2 further comprising a mounting tray located beneath the carrier, the mounting tray having means for attaching to the bridge to hold the bridge on the carrier, the tray having a channel within which the cropping mask is located.

5. The index print viewer of claim 1 wherein the base has a pair of side rails, the carriage slidably mounted on the side rails.

6. The index printer viewer of claim 1 wherein the base has a recessed bed for accepting an index print thereon.

7. The index print viewer of claim 1, wherein the bridge has a pair of upright legs, and a platform having an opening within which the magnifying lens is mounted.

8. The index print viewer of claim 1 wherein the bridge has a pair of sidewalls, and a pair of shoulders which define a receptacle which rests slidably on the carrier.

9. The index print viewer of claim 1 further comprising a mounting tray located beneath the carrier, the mounting tray having means for attaching to the bridge to hold the bridge on the carrier.

10. The index print viewer of claim 1 further comprising illumination means mounted on the movable bridge to illuminate an image located beneath the bridge.

11. The index print viewer of claim 10 further comprising a power source connected to the illumination means.

12. The index print viewer of claim 10 further comprising a switch for activating the illuminating means.

* * * * *